US012585020B2

(12) United States Patent
Klug et al.

(10) Patent No.: US 12,585,020 B2
(45) Date of Patent: Mar. 24, 2026

(54) DETECTION DEVICE WITH AT LEAST ONE SENSOR DEVICE, AN ANALYSIS DEVICE, A LIGHT SOURCE, AND A CARRIER MEDIUM

(71) Applicant: AUDI AG, Ingolstadt (DE)

(72) Inventors: Markus Klug, Ingolstadt (DE); Tobias Moll, Ingolstadt (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 1177 days.

(21) Appl. No.: 17/608,243

(22) PCT Filed: Apr. 30, 2020

(86) PCT No.: PCT/EP2020/062115
§ 371 (c)(1),
(2) Date: Nov. 2, 2021

(87) PCT Pub. No.: WO2020/225125
PCT Pub. Date: Nov. 12, 2020

(65) Prior Publication Data
US 2022/0229188 A1      Jul. 21, 2022

(30) Foreign Application Priority Data
May 3, 2019      (DE) ..................... 10 2019 206 374.8

(51) Int. Cl.
*G01S 17/894*       (2020.01)
*G01S 7/481*        (2006.01)
(Continued)

(52) U.S. Cl.
CPC ........... *G01S 17/894* (2020.01); *G01S 7/4811* (2013.01); *G01S 7/4818* (2013.01); *G01S 17/04* (2020.01);
(Continued)

(58) Field of Classification Search
CPC ...... G01S 7/4811; G01S 17/894; G01S 17/04; G06F 3/0421; G06T 7/521; G06T 7/70
See application file for complete search history.

(56) References Cited

U.S. PATENT DOCUMENTS 5,268,985 A      12/1993  Ando et al.
9,826,216 B1     11/2017  Hazeghi et al.
(Continued)

FOREIGN PATENT DOCUMENTS

CN            102150117        8/2011
CN            106461388        2/2017
(Continued)

OTHER PUBLICATIONS

Chinese Office Action dated Mar. 8, 2024 for parallel Chinese Application No. 202080032989.8.
(Continued)

*Primary Examiner* — Eric L Bolda
(74) *Attorney, Agent, or Firm* — STAAS & HALSEY LLP

(57)      ABSTRACT

A carrier medium is designed as a waveguide on which a coupling region and a decoupling region are provided. The coupling region is designed to couple light, which has been emitted from a light source and reflected on an object in the surroundings, into the carrier medium. The coupled reflected light is then transmitted to the decoupling region by internal reflection, and the reflected light is decoupled again at the decoupling region and is transmitted to the at least one sensor device, which is designed as a time-of-flight camera device. The sensor device provides the detected light in the form of sensor data, describing the propagation time of the light reflected on the object, to an analysis device that obtains object data, which describes the position of the object.

19 Claims, 3 Drawing Sheets

(51) Int. Cl.

| | | |
|---|---|---|
| *G01S 17/04* | (2020.01) | |
| *G06F 3/042* | (2006.01) | |
| *G06T 7/521* | (2017.01) | |
| *G06T 7/70* | (2017.01) | |

(52) U.S. Cl.
CPC ............ *G06F 3/0421* (2013.01); *G06T 7/521* (2017.01); *G06T 7/70* (2017.01); *G06T 2207/10028* (2013.01); *G06T 2207/30196* (2013.01)

(56) References Cited

U.S. PATENT DOCUMENTS

| | | | |
|---|---|---|---|
| 9,831,630 B2 | 11/2017 | Lipson | |
| 2009/0090605 A1 | 4/2009 | Arione et al. | |
| 2013/0127790 A1* | 5/2013 | Wassvik ................ | G06F 3/0428 |
| | | | 345/175 |
| 2018/0003805 A1 | 1/2018 | Popovich et al. | |
| 2019/0035291 A1* | 1/2019 | Saxena .............. | H04B 7/18506 |
| 2019/0353898 A1* | 11/2019 | Amirsolaimani .... | G02B 27/283 |
| 2022/0203882 A1* | 6/2022 | Klug ................... | G02B 6/0095 |

FOREIGN PATENT DOCUMENTS

| | | |
|---|---|---|
| CN | 107533137 | 1/2018 |
| CN | 109416249 | 3/2019 |
| CN | 109557522 | 4/2019 |
| CN | 111149040 | 5/2020 |
| DE | 10 2006 000 777 B4 | 6/2008 |
| DE | 10 2017 001 505 A1 | 8/2018 |
| DE | 10 2017 217 193 A1 | 3/2019 |
| DE | 10 2019 206 374.8 | 5/2019 |
| EP | 1 429 112 A1 | 6/2004 |
| WO | PCT/EP2020/062115 | 4/2020 |

OTHER PUBLICATIONS

International Search Report dated Aug. 12, 2020 for International Application No. PCT/EP2020/062115.
German Office Action dated Apr. 9, 2020 for German Application No. 10 2019 206 374.8.
Translation by WIPO of International Preliminary Report on Patentability for PCT/EP2020/062115, dated Jul. 22, 2021, 5 pp.
S.C. Barden et al., "Volume-phase holographic gratings and their potential for astronomical applications", Proceedings SPIE, vol. 3355, "Optical Astronomical Instrumentation", 1998, pp. 866-876.

* cited by examiner

DETECTION DEVICE WITH AT LEAST ONE SENSOR DEVICE, AN ANALYSIS DEVICE, A LIGHT SOURCE, AND A CARRIER MEDIUM

CROSS REFERENCE TO RELATED APPLICATIONS

This application is a U.S. national stage of International Application No. PCT/EP2020/062115, filed on Apr. 30, 2020. The International Application claims the priority benefit of German Application No. 10 2019 206 374.8 filed on May 3, 2019. Both the International Application and the German Application are incorporated by reference herein in their entirety.

BACKGROUND

Described below is a capturing apparatus with at least one sensor device, an evaluation device, a light source, and a carrier medium. The capturing apparatus allows optical capturing of an object in a surrounding area and a determination of the distance from the object.

Various methods are known for performing touch detection by a device, for example the capturing of a touch with the aid of capacitive sensor surfaces or optical systems, such as an infrared camera or other known camera system, or based on inductance or reflected laser light. With regard to the capturing of gestures within a specified space, a stereo camera or an evaluation algorithm, which is based on machine learning methods and embodied to interpret video material provided by a video camera, for example, can be used, for example.

U.S. Pat. No. 9,826,216 B1 illustrates a pattern projection system, which comprises a coherent light source. An optical unit of this system has a holographic optical element and is embodied to capture gestures, for which purpose a light pattern is generated by the optical element and projected onto a screen for imaging.

DE 10 2006 000 777 B4 illustrates an access control apparatus for enabling a driver or passenger to access a vehicle. The vehicle comprises an imaging surface on which an imaged presentation of a keyboard is generated by an imaging generator. The access control apparatus additionally comprises a camera with which a gesture can be detected that is performed by the driver or passenger in the vicinity of the imaged presentation of a keyboard. The imaging generator can comprise a see-through optical element or even a holographic optical element.

EP 1 429 112 A1 describes a holographic optical element for measuring the extent and location of an object with the aid of a deflected laser beam that sweeps over a specific angular range. In that case, the holographic optical element is irradiated by a plurality of laser beams with which a plurality of dimensions of a three-dimensional object are measured simultaneously, specifically based on differential patterns of the laser beams.

Optical diffraction gratings that are produced holographically and are therefore referred to as holographic gratings are generally known from the related art. In this regard, it is known from the scientific publication "Volume-phase holographic gratings and their potential for astronomical applications" (S. C. Barden, J. A. Arns and W. S. Colburn, Proceedings SPIE 3355, Optical Astronomical Instrumentation, 1998) that light that is incident on such a holographic grating at an angle that is clearly outside the angular range that meets the Bragg condition passes through the holographic grating without diffraction. However, if light is incident on the holographic grating at an angle such that the Bragg condition is at least approximately satisfied, the light is diffracted at an angle. A similar behavior can be seen with regard to a wavelength dependency of the influence of the holographic grating on light. This is because light having a wavelength that is clearly outside the wavelength range specified by the Bragg condition as the so-called Bragg wavelength likewise passes through the holographic grating without being diffracted, and only light having a wavelength that at least approximately satisfies the Bragg condition is diffracted at the holographic grating. Using complex holographic grating structures, it is thus possible, for example, for light having two different wavelength ranges to be diffracted at the same angle in each case. In addition, a holographic grating can be used, for example, to split light having different wavelengths into different light paths, with the result that a dispersive beam splitter can be implemented with the aid of a holographic grating.

None of the methods for touch and gesture capturing described above are embodied to be realized with the aid of a large-area medium. This is because touch and detection systems that are utilizable over a large area so far either have been limited in terms of their resolution or have a short range, which means that they are not utilizable in a room, for example having the size of a typical living space. In particular, gesture capturing systems are either not implementable two-dimensionally or require a large distance from an object to be examined in order to be able to cover a large area in terms of capturing technology. The reason is that point-type sensors and/or a plurality of point-type radar sensors are usually used.

SUMMARY

Following is a description of large-area capturing or detection of an object in a spatial section, wherein at the same time a relative location of the object with respect to a reference point can be precisely determined.

The capturing apparatus has at least one sensor device, an evaluation device, a light source, and an area-type carrier medium. The carrier medium thus has a greater length and width of a surface than a thickness of the carrier medium perpendicular to a surface plane of the surface. The carrier medium is implemented, for example, in the form of a plate, for example made of plastic or glass, wherein the carrier medium transmits light from a surrounding area to the at least one sensor device. The carrier medium is thus embodied in the form of a light guide, that is to say, the carrier medium represents a light-guiding medium. That is to say, the carrier medium can transmit light, which is coupled into the carrier medium, to the at least one sensor device by internal reflection, preferably total internal reflection. The sensor device, in turn, can capture the transmitted light, which is in particular coupled out of the carrier medium, and use it to generate sensor data of a specified type.

For coupling the light in and out, a coupling-in region and a coupling-out region are provided at the carrier medium. The carrier medium thus carries the coupling-in region and the coupling-out region and serves as a medium for guiding the light, which is why it is thus named here. The light source is embodied to emit light. The light source can be embodied, for example, to emit light in the visible wavelength range.

The coupling-in region is embodied in the form of a holographic element with a first deflection structure. A description of a mode of operation of such a holographic element, which may be an optical grating produced by holographic methods, can be found in the scientific publication cited above. The coupling-in region can therefore be implemented as a diffraction grating, for example. The first deflection structure of the coupling-in region is embodied to couple light that is emitted by the light source and reflected by an object in the surroundings of the capturing apparatus into the carrier medium.

The carrier medium is embodied to transmit the coupled-in light from the coupling-in region to the coupling-out region by internal reflection. The light that is incident on the first deflection structure of the coupling-in region from the object in the surroundings and is coupled into the carrier medium is thus guided within the carrier medium in zigzag-like movements in a direction parallel to a plane of the surface of the carrier medium, wherein the path of propagation is zigzag-shaped due to the total internal reflection.

The coupling-out region is likewise embodied in the form of a holographic element and has a second deflection structure. The second deflection structure is embodied to couple the transmitted, reflected light, which is incident on the second deflection structure of the coupling-out region, out of the carrier medium. Overall, therefore, light is emitted from the light source to the object in the surroundings. Such an object can be, for example, a particular item such as an apple or the fingertip of a user. The light is then reflected at the object, that is to say, for example, at the apple or the fingertip, wherein the reflected light is coupled into the capturing apparatus in the coupling-in region, is transmitted or guided further by the carrier medium, and is finally coupled out again in the coupling-out region.

The at least one sensor device of the capturing apparatus is then embodied to capture the light that is coupled out in the coupling-out region and to provide sensor data correlated therewith. The sensor device is embodied in this case in the form of a time-of-flight camera device. A time-of-flight camera device is generally embodied to measure a distance from an object using a time-of-flight method. To this end, an area surrounding the time-of-flight camera device is illuminated by a light pulse, as here with the aid of the light from the light source. The time-of-flight camera device then measures for each pixel a time that the light needs to travel to the object and back again. The time that is needed is directly proportional to the distance from the object. The time-of-flight camera device can thus establish for each image point the distance from the object imaged there. One measuring principle here corresponds to the measuring principle of laser scanning, but has the advantage that the entire surrounding area is recorded at once and does not have to be sampled. In general, time-of-flight camera devices can be used at a distance region of a few centimeters up to approx. 40 m. Such a time-of-flight camera device includes, in addition to an illumination unit, that is to say in addition to the light source, an optical unit, which collects the light reflected by the surroundings and images the surroundings on the sensor. This optical unit is implemented here in the form of the carrier medium with the coupling-in region and the coupling-out region. Using the sensor device of the capturing apparatus, it is therefore possible to provide the time of flight of the captured light in the form of sensor data, wherein the sensor data describe a time of flight of the light, which was emitted by the light source and reflected by the object, and the light was captured by the sensor device.

The evaluation device is embodied to evaluate the time-of-flight measurement, that is to say the sensor data, in order to determine the distance from the captured object. That is to say, the evaluation device is embodied to provide, taking into account the sensor data, object data that describe a relative location of the object with respect to a reference point. For this purpose, for example, corresponding time-of-flight values that are linked to respective distance values can be stored in the evaluation device. Thus, for example, the distance from the apple can be determined from the time of flight measured by the sensor device on the basis of the captured light. A relative location of the object with respect to the reference point can be understood to mean, for example, the distance between the object and a specified point on a surface of the capturing apparatus, for example on a carrier medium surface.

To capture the light that is coupled out of the carrier medium, the at least one sensor device abuts the coupling-out region, for example. To this end, the at least one sensor device can be adhesively bonded, for example, to the carrier medium, for example to an underside of the carrier medium, which is arranged opposite a front side of the carrier medium, on which the coupling-in region is provided and is consequently facing the surroundings. The coupling-in region is consequently arranged on one side of the carrier medium and the coupling-out region is arranged, for example, on the opposite side, wherein the at least one sensor device is arranged at this coupling-out region. Here, the at least one sensor device can be adhesively bonded to the carrier medium, or the carrier medium can be clamped in a holding device of the at least one sensor device.

The entire coupling-in region of the capturing apparatus thus serves as a capturing region for the light, which is ultimately passed on to the at least one sensor device and is provided there in the form of sensor data correlated with the light. The coupling-in region consequently forms a capturing region for the at least one sensor device. The coupling-in region therefore encompasses an entire side, that is to say the entire front side, of the carrier medium. This results in the advantage that the capturing region of the capturing apparatus may be any large contiguous area, depending on a size and extent of the carrier medium and in particular independently of the size of the at least one sensor device. This enables the surroundings to be captured over a large area, for example a section of a room, since a large section of the surroundings can be captured at the same time. In addition, a precise measurement of the relative location of the object in the surroundings is possible, since the described light guide is combined with a precisely measuring time-of-flight camera device as at least one sensor device.

The carrier medium with the coupling-in region and the coupling-out region is also embodied to be light-transmissive and consequently transparent, so that this part of the capturing apparatus can be configured as a transparent plate or film, which in principle even allows the use on both sides with appropriate positioning of the coupling-in region. The capturing region of the capturing apparatus is thus designed inconspicuously and can therefore be integrated inconspicuously into the surroundings, for example by fastening on a window pane. In addition, the capturing apparatus with the two-dimensionally designed carrier medium makes advantageous capturing of an object in the surroundings over a large area possible, wherein the relative location of the object with respect to the reference point can be precisely determined at the same time.

One embodiment makes provision for the coupling-in region and the coupling-out region to have, as a deflection structure, at least one optical grating, in particular a surface holographic grating or a volume holographic grating. In this context, the capturing apparatus can also be referred to as a HoloCam, short for holographic camera.

As already mentioned, an optical grating, also referred to as a diffraction grating, and its mode of action and production method are generally known, as is evident, for example, from the scientific publication cited above. In principle, an optical grating can be based on at least partially periodic structures, what is known as a grating structure, in a substrate. Using such a grating structure, an optical grating can bring about, through the physical effect of diffraction, light guidance, as is known, for example, from mirrors, lenses, or prisms. If light is, that is to say if light beams are, incident on the optical grating, wherein the incident light beams in particular satisfy the Bragg equation, the light beams are diffracted or deflected by the optical grating. The light can thus be guided in particular by interference phenomena of the light beams diffracted by the optical grating. The deflection structure of the coupling-in region or the coupling-out region can accordingly also be referred to as a diffraction structure.

An optical grating can be embodied to be direction-selective or angle-selective with respect to the incident light. Thus, only light, in particular a portion of the light, that is incident on an optical grating from a predetermined direction of incidence, for example at a predetermined angle, can be deflected. Light, in particular a portion of the light, that is incident on the optical grating from a different direction may not be deflected, or is deflected the less, the greater the difference to the predetermined direction of incidence is. The light portion that deviates from the predetermined direction of incidence or optimum direction of incidence can consequently propagate unhindered through the substrate with the optical grating.

Additionally or alternatively, an optical grating can also be embodied to be wavelength-selective or frequency-selective. Thus, only light, in particular a first portion of the light, having a predetermined wavelength can be deflected or diffracted by the optical grating at a specific angle of diffraction. Light, in particular a second portion of the light, having a wavelength other than the predetermined wavelength may not be deflected, or is deflected the less, the greater the difference to the predetermined wavelength is. The second light portion that deviates from the predetermined wavelength or optimum wavelength can consequently propagate unhindered through the substrate with the optical grating. In this way, for example, at least one monochromatic light portion can be split off from polychromatic light that is incident on the optical grating. The deflection effect for the optimum wavelength is advantageously at a maximum and decreases toward longer and shorter wavelengths, for example in the manner of a Gaussian bell, or becomes weaker. In particular, the deflection effect only acts on a fraction of the visible light spectrum and/or in an angular range of less than 90 degrees.

An optical grating can be produced in particular by light exposure of a substrate, that is to say for example photolithographically or holographically. In this context, the optical grating can then also be referred to as a holographic or holographic-optical grating. Two types of holographic-optical gratings are known: surface holographic gratings (in short: SHG) and volume holographic gratings (in short: VHG). In the case of a surface holographic grating, the grating structure can be generated by optically deforming a surface structure of the substrate. Due to the modified surface structure, incident light can be deflected, for example reflected. Examples of surface holographic gratings are what are known as sawtooth or blazed gratings. In contrast to this, the grating structure in the case of volume holographic gratings can be incorporated into the entire volume or part of the volume of the substrate. Surface holographic gratings and volume holographic gratings are usually frequency-selective. However, optical gratings that can diffract polychromatic light are also known. These are called multiplexed volume holographic gratings (in short: MVHG) and can be produced, for example, by changing the periodicity of the grating structure of an optical grating or by arranging a plurality of volume holographic gratings one behind the other.

A polymer, in particular a photopolymer, or a film, in particular a photosensitive film, for example made of plastics material or organic substances, is particularly suitable as the material of the substrate for incorporating an optical grating. Substrates that have a deflection structure for diffracting light, for example in the form of an optical grating, can also be referred to as holographic optical elements (HOE).

The described design of the coupling-in region and the coupling-out region therefore makes it possible to diffract the light that is incident on the coupling-in region toward the sensor device, making possible the large-area design of the carrier medium with the coupling-in region and the coupling-out region for the capturing apparatus.

In a particularly advantageous embodiment, provision is made for a light coupling-in region and a light coupling-out region to be provided at the carrier medium. The light coupling-in region is in turn embodied as a holographic element with a third deflection structure. The third deflection structure is configured to couple the light that is coming from the light source of the capturing apparatus and is incident on the third deflection structure into the carrier medium. For example, if the light source is arranged relative to the carrier medium with the coupling-in region and the coupling-out region in such a way that it does not emit the light directly onto the object in the surroundings, the light from the light source is first coupled into the carrier medium via the light coupling-in region. This allows a light source to be positioned, for example, in an outer frame of the capturing apparatus, with the light source not being optically captured by a viewer of the capturing apparatus, which is why the capturing apparatus can be embodied to be particularly inconspicuous.

The carrier medium is embodied to transmit the coupled-in light of the light source from the light coupling-in region to the light coupling-out region by internal reflection. The light coupling-out region is likewise embodied in the form of a holographic element with a fourth deflection structure. The fourth deflection structure is designed so that transmitted light that is incident on the fourth deflection structure is coupled out of the carrier medium and is emitted in the direction of the object in the surroundings. Both during the transmission of the light from the object to the at least one sensor device and also already on the path of the not yet reflected light from the light source to the object is it possible for the light to be at least partially guided and directed through the carrier medium.

It is then possible that, if the light source is attached, for example, laterally of the carrier medium, a compact capturing apparatus is implemented that does not require a light source that is spatially separated from the carrier medium with the coupling-in region and the coupling-out region and the at least one sensor device arranged thereon. This is because the light source can also be integrated spatially into the capturing apparatus itself, so that the property of the carrier medium as a light guide can be used to emit the light from the light source into the surroundings only after it has been coupled out of the carrier medium. The capturing apparatus is therefore particularly compact and is employable at various sites with little effort in terms of positioning, since, for example, there is no need for any complex adjustment of the light source in relation to the carrier medium.

The light coupling-out region can, for example, at least partially correspond to the coupling-in region. As an alternative or in addition to this, the light coupling-in region and the coupling-out region can partially overlap, for example in the case of a spatially close arrangement of the light source and the sensor device.

An additional embodiment makes provision for the object data provided to indicate a distance of the object from the capturing apparatus. In a simple scenario of the capturing apparatus, in which the latter has exactly one sensor device embodied in the form of a time-of-flight camera device, it is possible to gather from the object data by the sensor device and the evaluation device the distance at which the object is located in relation to the reference point of the capturing apparatus that is arranged, for example, on the surface of the carrier medium, and to quantify this distance. This is possible because the time of flight of the light from the light source to the sensor device is known, which can be gathered from the sensor data. Therefore, the duration to the time at which the reflected light arrives in the sensor device can be ascertained, and the time-of-flight difference between reflected and direct light can thus be ascertained. Based on the time-of-flight difference and the known position of the light source and the sensor device, the exact position of the captured object in the surroundings can be calculated. In order to be able to ascertain the distance from the capturing apparatus, a single sensor device is sufficient. The capturing apparatus can thus be used to capture the surroundings over a large area, in which the respective distance from individual objects in the surroundings to the capturing apparatus can be determined. Such a distance measurement is useful, for example, in combination with an image capturing device, that is to say with a camera device, since the distance information, that is to say the object data, can be used, for example, to focus the camera device or the imaged presentation of the surroundings recorded by the camera device.

In addition, one embodiment makes provision for the capturing apparatus to include at least two sensor devices, which are each arranged spatially separated from one another. The two sensor devices are arranged, for example, at a distance of 1 cm to 50 cm from one another. The evaluation device is here designed to use the sensor data of the at least two sensor devices to establish coordinates of the object if the object is positioned on the capturing apparatus that on the surface of the carrier medium, and to provide the coordinates in the form of object data. For example, a touch-sensitive operating device, that is to say what is known as a touch functionality, can be provided on the surface of the carrier medium of the capturing apparatus. The coordinates are then 2D coordinates (X,Y). The carrier medium with the coupling-in region and the coupling-out region can thus be embodied, for example, in the form of a cover plate or cover film for a touch-sensitive screen of a device. The capturing apparatus is here designed to determine the coordinate of a finger that is placed on this cover plate or cover film. This is because the light reflected at the user's finger positioned on the cover plate or on the cover film can be captured in each case by the at least two sensor devices, with the result that the relative location of the finger with respect to a reference point can ultimately be described using the sensor data obtained from these two sensor devices, wherein the corresponding coordinates of the finger are given here as the relative location of the object. In this way, for example, the touch-sensitive functionality of the screen on which the capturing apparatus is arranged can at least be supported, since the position of the finger on the surface is established and provided. This enables the detection of a position at which a touch of the capturing apparatus takes place. Due to the large-area design of the carrier medium with the coupling-in region and the coupling-out region, it is possible for a relatively large screen surface to be covered with the capturing apparatus in the form of a cover plate or cover film and thereby for the precise determination of the coordinates of the object, such as the finger, on the capturing apparatus to be provided. For the capturing apparatus described, in particular, no pressure sensor is necessary for allowing at least the relative location of the object on a screen covered with the cover plate or cover film described to be determined.

Another particular embodiment makes provision for the capturing apparatus to include at least three sensor devices that are in each case spatially separated from one another. The evaluation device is designed to use the sensor data of the at least three sensor devices to establish a spatial arrangement of the object in the surroundings in relation to the capturing apparatus and to provide it in the form of object data. Accordingly, at least three sensor devices are necessary for measuring the relative location in three-dimensional space. They are arranged, for example, at at least three different corners of the carrier medium, which has a large rectangular or square shape, for example, with the coupling-in region and the coupling-out region. Using the at least three provided sensor data from in each case different sensor devices, each of which describes at least the time of flight of the light that is emitted by the light source and is reflected at the object, object data can now be provided that indicate spatial coordinates and thus the spatial position of the object in relation, for example, to the reference point of the capturing apparatus. For example, it is possible to ascertain where on the surface of the carrier medium with the coupling-in region and the coupling-out region, and also at what distance from the surface at this location, the object is arranged. The relative location of the object with respect to the reference point can therefore describe the spatial relative location of the object with respect to the reference point. The capturing apparatus thus makes reliable and thorough large-area capturing of the object in the surroundings of the capturing apparatus with regard to the spatial coordinates of this object in relation to the capturing apparatus possible.

In a particularly advantageous embodiment, provision is made for the coupling-in region and the coupling-out region to be formed in one piece with the carrier medium, or for the carrier medium to be formed as a separate element from the coupling-in region and the coupling-in region. In the first case, the coupling-in region and the coupling-out region can thus, for example, be incorporated directly on a surface of the carrier medium. This means that the deflection structure can be for example etched or lasered into the surface of the carrier medium. Thus, the carrier medium itself can be embodied in the form of a HOE. In the second case, the coupling-in region, the coupling-out region, and the carrier medium can be formed separately. In this case, the coupling-in region and the coupling-out region can form, for example, at least one first element, and the carrier medium can form a second element which abuts the first element. The coupling-in region and the coupling-out region can thus be formed in at least one HOE. For example, the coupling-in region and the coupling-out region can be formed in different sections of a holographic film or plate. To fasten the film or plate to the carrier medium, the film of the plate can be adhesively bonded to the carrier medium. Alternatively, the holographic film can also be embodied in the form of an adhesive film and adhere to the surface of the carrier medium directly, that is to say without adhesive, by molecular forces. The capturing apparatus with the carrier medium and the coupling-in region and coupling-out region arranged thereon can thus be produced in various ways and in particular cost-effectively.

In an embodiment, provision is made for the light source to be embodied to emit pulsed light. This makes a particularly simple form of measurements with a time-of-flight camera device possible, because the latter usually works with emitted light pulses. To this end, the illumination, that is to say the light source, is switched on for a brief moment, whereupon the light pulse illuminates the surroundings and is reflected at the object in the surroundings. Depending on the distance from the object, the light that is incident on the object experiences a delay. However, due to the speed of the light being the speed of light, these times are very short. However, since the pulse length is selected to be very small and is, for example, only 50 ns, distances from objects of, in this example, up to seven to eight meters can be measured. As an alternative or in addition to this, the light can be emitted in a modulated manner, for example in order to be able to provide particularly accurate and precise sensor data.

A further embodiment makes provision for the capturing apparatus to include an image capturing device, which is embodied to capture the light that is coupled out of the coupling-out region and to provide it in the form of image data that correlate with the captured light. The image capturing device can be implemented as an image sensor or camera, each with or without an imaging optical unit, such as a lens or a lens system. The image capturing device is therefore designed for the photographic and/or video-based generation of an imaged presentation of the object in the surroundings. The capturing apparatus can thus be embodied overall in the form of an apparatus for recording static or moving images, which represent an imaged presentation of the object in the surroundings of the capturing apparatus. The image capturing device can in particular be embodied in the form of an image sensor, for example a CCD (charged coupled device) sensor or as a CMOS (complementary metal oxide semiconductor) sensor. When the image capturing apparatus is designed as an image sensor, the carrier medium at which the coupling-in region and the coupling-out region are arranged can additionally take on the task of an objective, that is to say of an imaging optical unit. Alternatively, the image capturing apparatus can also be implemented in the form of a camera or photographic camera, in particular a micro-camera, such as is embodied in a smartphone, for example, with its own imaging optical unit. Overall, the entire coupling-in region of the capturing apparatus can serve as a capturing region for light, which is ultimately passed on to the image capturing apparatus and is provided there in the form of image data correlated with the light. The coupling-in region can thus form a type of camera sensor for the image capturing apparatus. This makes it possible that, in addition to the distance information of the object, the object itself is imaged, with the result that a clear assignment of the optical configuration of the object to the captured distance, the specific coordinates, and/or the specific spatial arrangement of the object is possible.

An additional embodiment makes provision for the evaluation device to be embodied to evaluate the images, taking into account the object data and a specified interpretation criterion, and to provide an interpretation signal describing the interpreted image data. The interpretation criterion can be determined for example with the aid of machine learning methods, that is to say with the aid of artificial intelligence methods, such as with the aid of an artificial neural network. In this case, the typical size, shape, color, and/or surface properties that specific specified sample objects have can be stored for example in the evaluation device. For example, corresponding data can be stored that describe a typical apple as a sample object. Taking into account these data from sample objects, the image data obtained and the object data of the object, it is now possible to discern, for example with the aid of the evaluation device, that there is an apple at the specified distance. This information can then be provided with the aid of the corresponding interpretation signal. This ultimately makes it possible to also draw exact conclusions about gestures or actions from the data obtained by the capturing apparatus. For example, it is possible to differentiate and recognize whether a hand that is located in front of the capturing apparatus is showing a first or an extended index finger if, for example, corresponding sample object data are stored for these hand gestures and can consequently be recognized or at least learned. With the capturing apparatus, gesture recognition based on measurements from at least one time-of-flight camera device is thus possible in a large surrounding area. In this case, already known methods of evaluation and interpretation of image data can be used.

BRIEF DESCRIPTION OF THE DRAWINGS

Exemplary embodiments will be described below in conjunction with the accompanying drawings of which.

DETAILED DESCRIPTION

In the exemplary embodiments discussed below, the described components of the embodiments each represent individual features that should be considered independently of one another and also develop the invention in each case independently of one another. The disclosure is therefore also intended to include combinations of the features of the embodiments other than those illustrated. Furthermore, the described embodiments may also be supplemented by further features that have already been described.

In the figures, identical reference signs each denote elements of identical function.

Figure 1:
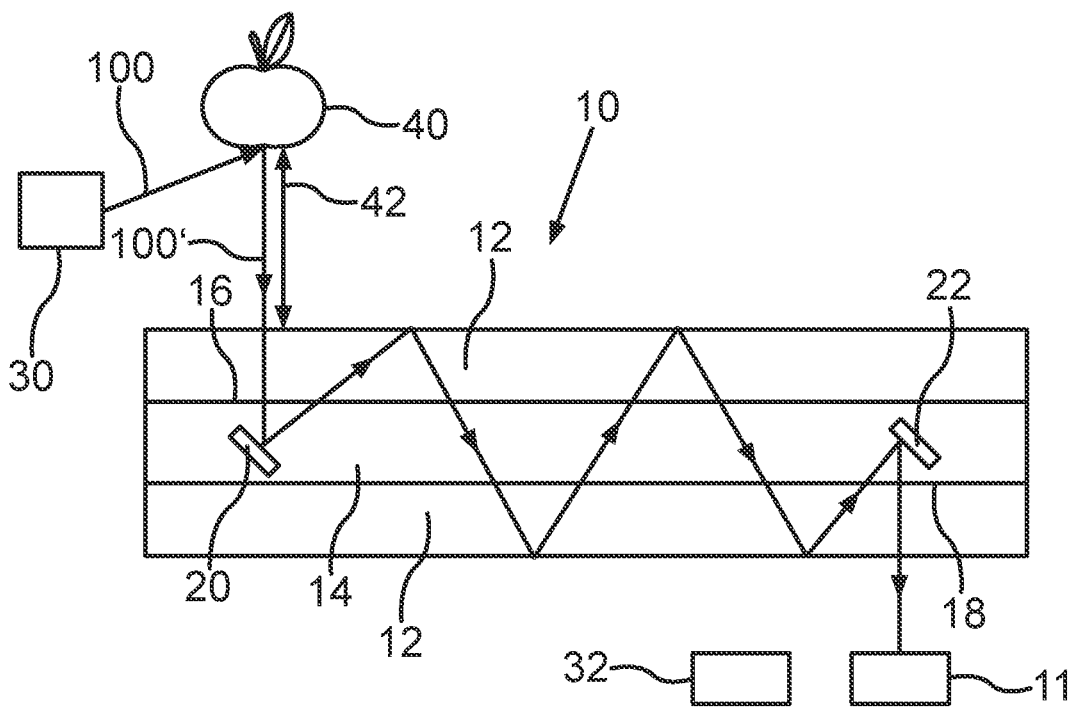
FIG. 1 is a schematic illustration of a capturing apparatus, in front of which an object is positioned.

A capturing apparatus 10 is shown in FIG. 1, which includes a sensor device 11, an evaluation device 32, a light source 30, and a carrier medium 12. The carrier medium 12 is embodied in the form of a light guide, on which a coupling-in region 16 and a coupling-out region 18 are provided. The light source 30 is embodied to emit light 100. In this example, the light source 30 is arranged spatially separated from the carrier medium 12. The light 100 from the light source 30 is incident on an object 40, which is drawn here in the form of an apple, and which is arranged in a surrounding area of the capturing apparatus 10. The light 100 is reflected at this object 40 and is referred to below as reflected light 100'. The object 40 is located at a distance 42 from a surface of the carrier medium 12.

The coupling-in region 16 is embodied in the form of a holographic element 14 with a first deflection structure 20. The first deflection structure 20 is designed to couple the reflected light 100', which was emitted as light 100 by a light source 30 and reflected at the object 40 in the surroundings of the capturing apparatus 10, into the carrier medium 12. The carrier medium 12 is in turn embodied to transmit the coupled-in reflected light 100' with internal reflection from the coupling-in region 16 to the coupling-out region 18. The coupling-out region 18 is embodied in the form of a holographic element 14 with a second deflection structure 22. The second deflection structure 22 is designed to couple the transmitted reflected light 100' that is incident on the second deflection structure 22 out of the carrier medium 12.

The sensor device 11 is embodied in the form of a time-of-flight camera device. The sensor device 11 is designed to capture the reflected light 100' coupled out in the coupling-out region 18 and to provide it in the form of sensor data. The sensor data describe a time of flight of the light 100', which was reflected at the object 40 and was captured by the sensor device 11. The evaluation device 32 is embodied to provide object data relating to the object 40, taking into account the sensor data. These object data describe a relative location of the object 40 with respect to a reference point of the capturing apparatus 10. The reference point of the capturing apparatus 10 is, for example, a specified point on the surface of the carrier medium 12, with the result that a relative location of the object 40 with respect to the capturing apparatus 10 can be indicated or described by the distance 42.

The coupling-in region 16 and the coupling-out region 18 have at least one optical grating as a respective deflection structure 20, 22, which grating is embodied in particular in the form of a volume holographic grating or a surface holographic grating. The coupling-in region 16 and the coupling-out region 18 are either formed in one piece with the carrier medium 12, or, alternatively, the carrier medium 12 can be formed as a separate element from the coupling-in region 16 and the coupling-out region 18. The light source 30 is embodied to emit pulsed light 100.

Figure 2:
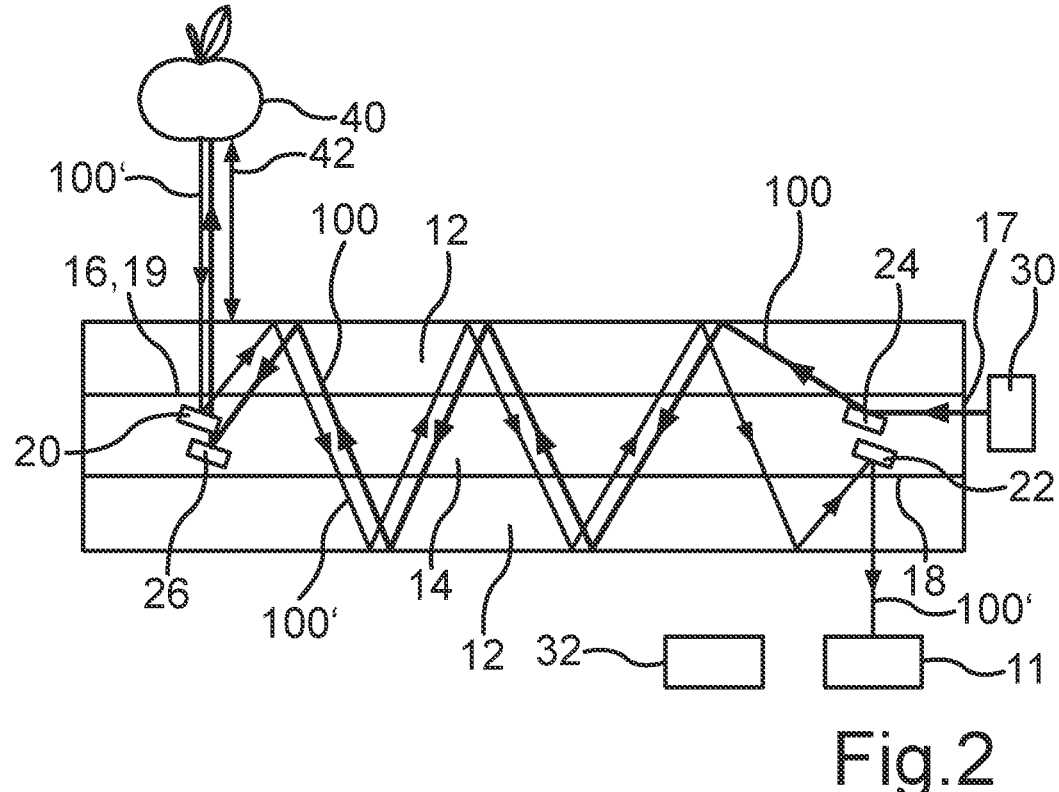
FIG. 2 is a schematic illustration of a capturing apparatus, in which a light source is arranged at a carrier medium.

FIG. 2 shows the capturing apparatus 10 with a light source 30 coupled to the carrier medium 12. The light source 30 is arranged at a light coupling-in region 17, which is likewise provided by the carrier medium 12. The light coupling-in region 17 is embodied in the form of a holographic element 14 with a third deflection structure 24. The third deflection structure 24 is designed to couple the light 100 that is coming from the light source 30 and is incident on the third deflection structure 24 into the carrier medium 12. The carrier medium 12 is embodied to transmit the light 100 that is coupled in in this way by internal reflection from the light coupling-in region 17 to a light coupling-out region 19, wherein the light coupling-out region 19 is likewise provided by the carrier medium 12. The light coupling-out region 19 is embodied in the form of a holographic element 14 with a fourth deflection structure 26. The fourth deflection structure 26 is designed to couple the transmitted light 100, which is incident on the fourth deflection structure 26, out of the carrier medium 12 and to emit it in the direction of the object 40 in the surroundings. FIG. 2 thus shows a capturing apparatus 10, in which both the light 100 from the light source 30 and also the light 100' that is reflected at the object 40 is each guided through the carrier medium 12 embodied in the form of a light guide. The course of the reflected light 100' here corresponds to the course of the reflected light 100', which has already been described in connection with FIG. 1.

Figure 3:
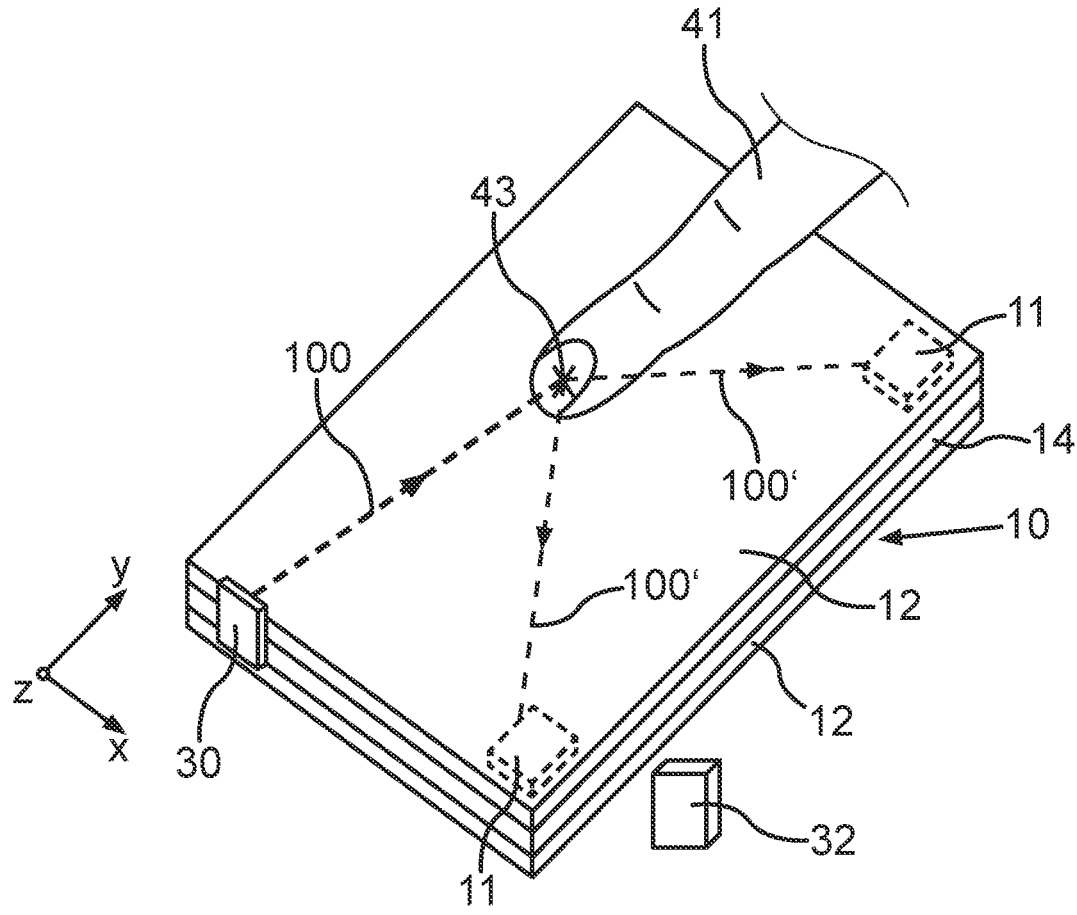
FIG. 3 is a schematic illustration of a capturing apparatus with two sensor devices.

FIG. 3 shows the capturing apparatus 10 with two sensor devices 11. In this case, the sensor devices 11 are each arranged below a front side of the carrier medium 12 facing the object 40. FIG. 3 shows a finger 41 as the object 40, which touches the carrier medium 12 at specified coordinates 43, which are symbolized by a cross in FIG. 3. The light source 30, which is arranged here on an outside of the carrier medium 12, that is to say corresponds to the setup in FIG. 2, now transmits light 100 through the carrier medium 12 to the light coupling-out region 19, which here corresponds to the coupling-in region 16 and consequently to a region of the surface of the carrier medium 12 on the front side toward the surroundings. The light 100' reflected at the finger 41 is coupled into the carrier medium 12 via the coupling-in region 16 and transmitted to the two sensor devices 11. The two sensor devices 11 are each arranged spatially separated from one another. The evaluation device 32 is now designed to use the sensor data of the two sensor devices 11 to determine the coordinates 43 of the finger 41 on the capturing apparatus 10 and to provide them in the form of object data. Since two sensor devices 11 are provided in this case, an additional coordinate 43, that is to say overall an x and a y coordinate 43 of the object 40, which here is the finger 41, can be determined.

Figure 4:
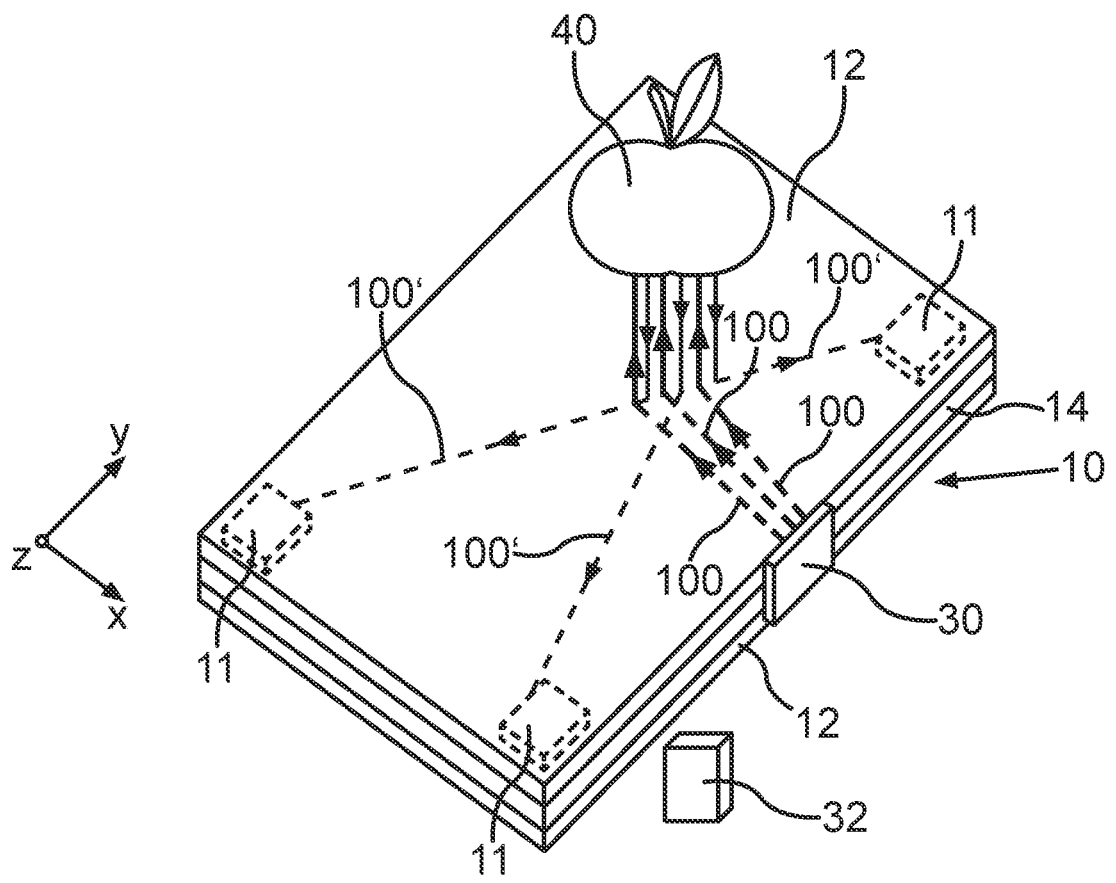
FIG. 4 is a schematic illustration of a capturing apparatus with three sensor devices.

FIG. 4 shows the capturing apparatus 10 with now three sensor devices 11. The three sensor devices 11 are again arranged spatially separated from one another at the carrier medium 12 in the region of the respective coupling-out regions 18. The evaluation device 32 is now designed to use the sensor data of the three sensor devices 11 to establish a spatial arrangement of the object 40, which is arranged in the surroundings of the capturing apparatus 10, in relation to the capturing apparatus 10 and to provide it in the form of object data.

The capturing apparatus 10 can additionally include an image capturing device, which is embodied to capture the light 100' that is coupled out of the coupling-out region 18 and to provide it in the form of image data that correlate with the captured light 100'. Optical imaging of the object 40 is therefore also possible. The evaluation device 32 can here be embodied to evaluate the image data, taking into account the object data and a specified interpretation criterion, and to provide an interpretation signal describing the interpreted image data. In this way, for example, image recognition and gesture or action recognition can be carried out. For example, a movement of the object 40 in relation to the capturing apparatus 10 can be captured and also interpreted, such that, for example, the interpretation signal includes that the apple, that is to say the object 40, has shifted a total of 5 cm to the left and has also been rotated through an angle of 30°.

Overall, the examples show how to provide touch and gesture detection by a time-of-flight camera device and by a holographic optical element (HOE). Here, the carrier medium 12, which is transparent on at least one side and is embodied in the form of a HOE, is supplemented by the at least one sensor device 11, which is embodied in the form of a time-of-flight camera device for capturing three-dimensional objects. The object 40, which is captured hereby, can be located in front of or behind the carrier medium 12. As a result, large-area capturing of the surroundings of the capturing apparatus 10 is ultimately possible. At the same time, a precise measurement takes place in the surroundings or on the surface of the capturing apparatus 10, the carrier medium 12 of which with the coupling-in region 16 and the coupling-out region 18 is embodied, for example, in the form of a transparent, two-dimensional cover plate or cover film for a touch-sensitive screen of a device, such as a mobile device (smartphone). In addition, a measurement over a previously unusable transparent surface, for example the screen of the device on which the two-dimensional cover plate or cover film is attached, and also the use of the capturing apparatus 10 on both sides in the case of a carrier medium 12 with opposite coupling-in regions 16 become possible.

For this purpose, pulsed light 100 from the light source 30 is ultimately coupled into the carrier medium 12 via a holographic function, i.e. via the carrier medium 12, with the coupling-in region 16 and the coupling-out region 18, is distributed therein, and is coupled out via the coupling-out region 18. If this light 100 is incident on the object 40, it is reflected back to the carrier medium 12, is coupled in there and transmitted to the at least one sensor device 11. Since the time of flight of the light 100 from the light source 30 to the respective sensor device 11 is known, the time until the arrival of the reflected light 100' can be measured and the time-of-flight difference between reflected light 100' and direct light 100 can thus be ascertained. Using this time-of-flight difference and the known position of the light source 30 and of the individual sensor devices 11, the exact position of the captured item in space, that is to say of the object 40 in the surroundings, can be calculated. As a result, a distance 42, coordinates 43, and/or a spatial arrangement of the object 40 in the surroundings become capturable. In principle, it can be said here that each dimension to be captured requires one sensor device 11. The one sensor device 11 is consequently sufficient for a straight-line measurement in a plane, and two sensor devices 11 are sufficient for a measurement on a surface (see FIG. 3). For a measurement in space, that is to say to determine the spatial arrangement of the object 40, at least three sensor devices 11 are accordingly required (see FIG. 4). The capturing apparatus 10 can also be combined with the recognition of image contents in order to be able to draw more exact conclusions about gestures or actions. It is possible to recognize as a gesture, for example, whether the user is showing a first or an extended index finger.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A capturing apparatus for detecting an object, comprising:
   a light source,
   a two-dimensional carrier medium comprising a light guide having a first coupling-in region and a first coupling-out region,
      the first coupling-in region comprising a first holographic element with a first deflection structure to couple light emitted by the light source and reflected by the object in a surrounding area of the capturing apparatus, into the two-dimensional carrier medium which transmits the light by internal reflection from the first coupling-in region to the first coupling-out region, and
      the first coupling-out region comprising a second holographic element with a second deflection structure to couple the light incident on the second deflection structure out of the two-dimensional carrier medium;
   at least two spatially-separated time-of-flight cameras to capture the light from the first coupling-out region and to provide sensor data correlated with the captured light to describe a time of flight of the light emitted by the light source and reflected by the object; and
   an evaluator to provide, based on the sensor data, object data that describe a relative location of the object with respect to a predetermined reference point, wherein the evaluator, based on the sensor data of the at least two time-of-flight cameras, establishes coordinates of the object relative to the capturing apparatus as the object data.

2. The capturing apparatus as claimed in claim 1, wherein the first coupling-in region and the first coupling-out region each have at least one of a volume holographic grating and a surface holographic grating.

3. The capturing apparatus as claimed in claim 2, wherein a second coupling-in region and a second coupling-out region are provided at the carrier medium, the second coupling-in region embodied as comprising a third holographic element with a third deflection structure to couple light, emitted by the light source and incident on the third deflection structure, into the two-dimensional carrier medium, wherein the two-dimensional carrier medium is embodied to transmit the light by internal reflection from the second coupling-in region to the second coupling-out region, and wherein the second coupling-out region is embodied as comprising a fourth holographic element with a fourth deflection structure to couple the transmitted light incident on the fourth deflection structure out of the two-dimensional carrier medium towards the object in the surrounding area.

4. The capturing apparatus as claimed in claim 3, wherein the object data indicate a distance of the object from the capturing apparatus.

5. The capturing apparatus as claimed in claim 4, wherein the evaluator, based on the sensor data of the at least two time-of-flight cameras, establishes coordinates of the object relative to the capturing apparatus as the object data.

6. The capturing apparatus as claimed in claim 5, wherein the capturing apparatus comprises at least three spatially separated time-of-flight cameras and the evaluator, based on the sensor data of the at least three time-of-flight cameras, establishes a spatial arrangement of the object in the surrounding area in relation to the capturing apparatus as object data.

7. The capturing apparatus as claimed in claim 6, wherein the first coupling-in region and the first coupling-out region are formed in one piece with the two-dimensional carrier medium.

8. The capturing apparatus as claimed in claim 6, wherein the two-dimensional carrier medium is formed as a separate element from the first coupling-in region and the first coupling-out region.

9. The capturing apparatus as claimed in claim 6, wherein the light source to emit pulsed light.

10. The capturing apparatus as claimed in claim 8, wherein the capturing apparatus comprising an image capturing device to capture the light coupled out of first the coupling-out region and to provide image data based on the light captured.

11. The capturing apparatus as claimed in claim 9, wherein the evaluator to evaluate the image data, taking into account the object data and a specified interpretation criterion, and to provide an interpretation signal describing the image data.

12. The capturing apparatus as claimed in claim 1,
wherein a second coupling-in region and a second coupling-out region are provided at the carrier medium, the second coupling-in region comprising a third holographic element with a third deflection structure to couple light, emitted by the light source and incident on the third deflection structure, into the two-dimensional carrier medium, wherein the two-dimensional carrier medium to transmit the light by internal reflection from the second coupling-in region to the second coupling-out region, and wherein the second coupling-out region comprising a fourth holographic element with a fourth deflection structure to couple the transmitted light incident on the fourth deflection structure out of the two-dimensional carrier medium towards the object in the surrounding area.

13. The capturing apparatus as claimed in claim 1, wherein the object data indicate a distance of the object from the capturing apparatus.

14. The capturing apparatus as claimed in claim 1, wherein the capturing apparatus comprises at least three spatially separated time-of-flight cameras and the evaluator, based on the sensor data of the at least three time-of-flight cameras, establishes a spatial arrangement of the object in the surrounding area in relation to the capturing apparatus as the object data.

15. The capturing apparatus as claimed in claim 1, wherein the first coupling-in region and the first coupling-out region are formed in one piece with the two-dimensional carrier medium.

16. The capturing apparatus as claimed in claim 1, wherein the two-dimensional carrier medium is formed as a separate element from the first coupling-in region and the first coupling-out region.

17. The capturing apparatus as claimed in claim 1, wherein the light source to emit pulsed light.

18. The capturing apparatus as claimed in claim 1, wherein the capturing apparatus comprising an image capturing device to capture the light coupled out of first the coupling-out region and to provide image data based on the light captured.

19. The capturing apparatus as claimed in claim 18, wherein the evaluator to evaluate the image data, taking into account the object data and a specified interpretation criterion, and to provide an interpretation signal describing the image data.

*  *  *  *  *